(12) United States Patent
Park

(10) Patent No.: US 6,851,025 B2
(45) Date of Patent: *Feb. 1, 2005

(54) CACHE MANAGEMENT SYSTEM USING CACHE CONTROL INSTRUCTIONS FOR CONTROLLING THE OPERATION OF CACHE

(75) Inventor: Soung Hwi Park, Chungcheongbuk-do (KR)

(73) Assignee: Hynix Semiconductor Inc., Kyoungki-do (KR)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/209,279

(22) Filed: Dec. 11, 1998

(65) Prior Publication Data

US 2002/0026561 A1 Feb. 28, 2002

(30) Foreign Application Priority Data

Dec. 12, 1997 (KR) .............................................. 97-68194

(51) Int. Cl.$^7$ .............................................. G06F 12/00
(52) U.S. Cl. ........................ 711/137; 711/140; 711/141; 711/138
(58) Field of Search ................................ 711/137, 140, 711/141, 138

(56) References Cited

U.S. PATENT DOCUMENTS

| | | | | |
|---|---|---|---|---|
| 5,732,278 A | * | 3/1998 | Furber et al. .................. | 712/41 |
| 5,778,423 A | * | 7/1998 | Sites et al. ................... | 711/118 |
| 5,796,971 A | * | 8/1998 | Emberson .................... | 395/383 |
| 5,838,945 A | * | 11/1998 | Emberson .................... | 395/376 |
| 5,854,934 A | * | 12/1998 | Hsu et al. .................... | 395/709 |
| 5,948,095 A | * | 9/1999 | Arora et al. ................. | 712/200 |
| 5,964,867 A | * | 10/1999 | Anderson et al. ........... | 712/219 |
| 6,000,044 A | * | 12/1999 | Chrysos et al. ............... | 714/47 |
| 6,055,621 A | * | 4/2000 | Puzak .......................... | 712/207 |
| 6,070,009 A | * | 5/2000 | Dean et al. .................. | 395/704 |
| 6,128,703 A | * | 10/2000 | Bourekas et al. ........... | 711/138 |
| 6,131,145 A | * | 10/2000 | Matsubara et al. ......... | 711/137 |
| 6,139,199 A | * | 10/2000 | Rodriguez .................... | 395/709 |
| 6,148,439 A | * | 11/2000 | Nishiyama .................... | 717/9 |
| 6,219,759 B1 | * | 4/2001 | Kumakiri ..................... | 711/137 |
| 6,249,845 B1 | * | 6/2001 | Nunez ......................... | 711/129 |

OTHER PUBLICATIONS

Furber, "VLSI RISC Architecture and Organization", 1989, pp. 32–39.

* cited by examiner

*Primary Examiner*—Kimberly McLean-Mayo
(74) *Attorney, Agent, or Firm*—Piper Rudnick LLP

(57) ABSTRACT

A cache management system includes a main memory for storing instructions and information for identifying cache control instructions, a central processing unit (CPU) for executing the instructions, an instruction identifier for identifying that an instruction stored the main memory is a cache control instruction, a cache controller for predicting a next instruction to be executed by the CPU and for reading a corresponding program information in advance when the cache control instruction is identified by the instruction identifier, and a cache memory for storing executable instructions and data from the main memory and for supplying the executable instructions to the CPU under the control of the cache controller.

6 Claims, 2 Drawing Sheets

CACHE MANAGEMENT SYSTEM USING CACHE CONTROL INSTRUCTIONS FOR CONTROLLING THE OPERATION OF CACHE

This application claims the benefit of Korean Patent Application No. 68194/1997, filed Dec. 12, 1997, which is hereby incorporated by reference.

FIELD OF THE INVENTION

1. Field of the Invention

The present invention relates to a cache management system, and more particularly, to a cache management system which improves performance of the system by increasing cache hit ratio.

2. Discussion of the Related Art

Generally, a main memory, which is relatively slow compared to a central processing unit (CPU), uses a cache unit to rapidly transmit an instruction word to the CPU.

The cache unit includes a cache controller and a cache memory. The cache unit fetches program data, which will be requested by the CPU, from the main memory in advance of instruction execution by the CPU, and transmits the program data to the CPU upon request from the CPU. The cache unit allows the CPU to rapidly process the program data by using a fist cache memory.

Since the cache memory has only a small capacity compared to the capacity of the main memory, it is essential that the cache memory selectively store the program data requested by the CPU within a short time. Thus, the effectiveness of the cache memory can be expressed as cache hit ratio of the cache memory.

Meanwhile, if the program information (i.e., executable instructions and data on which the instructions operate) requested by the CPU is not stored in the cache memory, the program information must be fetched from the main memory, which is relatively slow. In this case, processing time is delayed, reducing CPU throughput.

Therefore, the performance of the CPU depends on the cache hit ratio, and the performance of the CPU improves as the cache hit ratio increases To improve the cache hit ratio, the cache controller, which controls the cache memory, adopts various methods for fetching the program information from the main memory into the cache memory.

A conventional cache management system will be described with reference to FIG. 1. As shown in FIG. 1, the conventional cache management system includes a main memory 11 for storing program information including instructions which are to be executed by the CPU, a cache controller 12 for fetching the program information stored in the main memory 11, a cache memory 13 for storing the program info ion fetched from the cache controller 12, and a CPU 14 for executing the instructions.

The operation of the conventional cache management system will be described below.

The program information including the instructions to be executed by the CPU 14 is stored in the main memory 11. If the CPU 14 outputs an address through an address bus line to fetch and execute a desired instruction, the main memory 11 provides the program information including instructions and data, corresponding to the program address to the CPU 14.

At this time, since the main memory 11 is slow compared to the CPU 14, the CPU 14 must wait for the program information to be fetched from the main memory 11. This reduces the operational efficiency of the CPU.

For this reason in order to fetch the program information rapidly, the program information including the instruction to be executed by the CPU 14 is stored in advance in the first cache memory 13 under control of the cache controller 12. Subsequently, the program information stored in the cache memory 13 is fetched to the CPU 14 if the program address is output from the CPU 14, so that the instruction can be executed by the CPU 14.

At this time, if the program information to be executed by the CPU 14 is not stored in the cache memory 13, the program information is fetched from the main memory 11, thereby delaying the execution of the instruction by the CPU 14.

Therefore, the cache controller 12 controls the cache memory 13 to fetch the program information from the main memory 11 to the cache memory 13 in response to the program address so as to not delay the execution of the instruction by the CPU 14.

The cache controller 12 predicts necessary program information depending on the current program address of the CPU 14 and fetches the next program information to the cache memory 13. If the current program address of the CPU 14 is requested to be moved to another address, the cache controller 12 fetches program information of a corresponding destination address.

However, the conventional cache management system has the following problem. Since the cache unit depends on the current operation of the CPU regardless of the program being executed, it is difficult to exactly predict the program information that will be needed next Thus, the CPU is frequently forced to directly fetch the program information from the main memory, thereby reducing the cache hit ratio.

SUMMARY OF THE INVENTION

Accordingly, the present invention is directed to a cache management system that substantially obviates one or more of the problems due to limitations and disadvantages of the related art.

An object of the present invention is to provide a cache management system which efficiently controls a cache unit to improve a cache hit ratio.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided a cache management system including a main memory for storing instructions and information for identifying cache control instructions, a central processing unit (CPU) for executing instructions, an instruction identifier for identifying an instruction stored in the main memory is a cache control instruction, a cache controller for predicting a next instruction to be executed by the CPU and for reading corresponding program information in advance when the cache control instruction is identified by the instruction identifier, and a cache memory for storing executable instructions and data from the main memory and for supplying be executable instructions to the CPU under the control of the case controller.

In another aspect of the present invention, there is provided a computer system including a central processing unit a cache unit including a cache memory and a cache controller, and a main memory for storing instructions and data, wherein the instructions include cache control instructions for controlling the cache controller and the executable instructions to be executed by the central process unit, wherein an instruction stored in the main memory includes information identifying whether the instruction is an executable instruction or a cache control instruction.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute apart of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
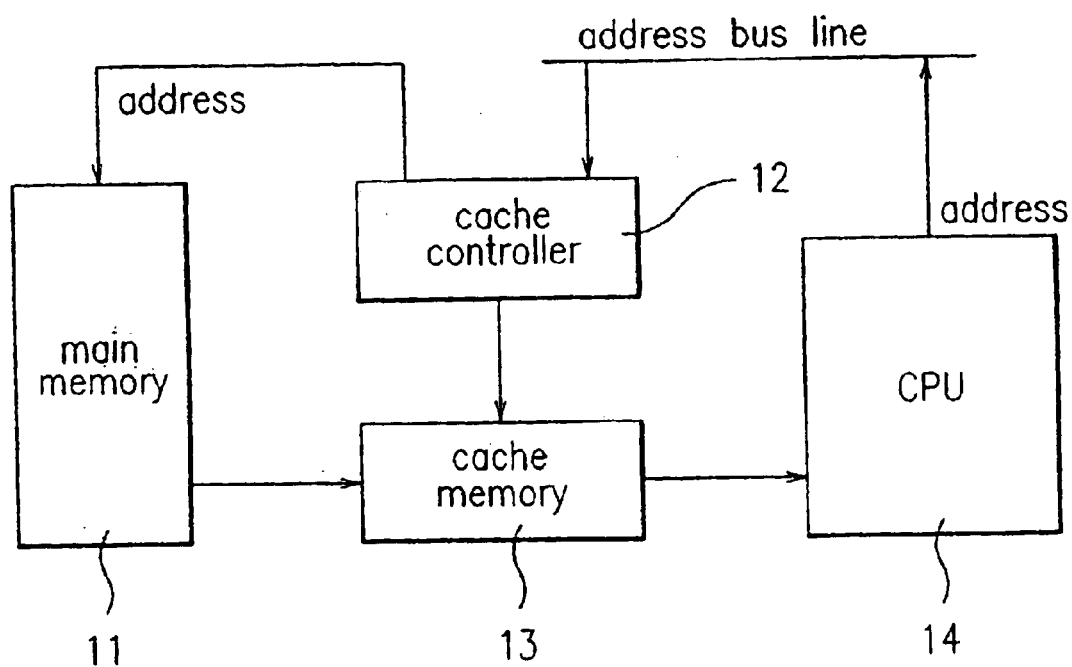
FIG. 1 is a block diagram illustrating a conventional cache management system.
Figure 2:
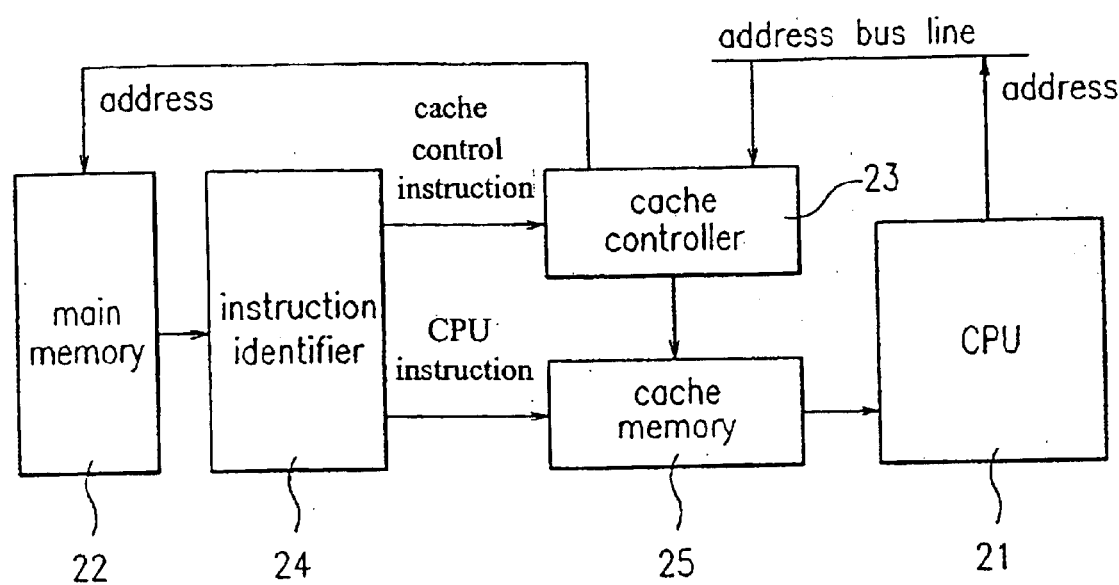
FIG. 2 is a block diagram illustrating a cache management system according to the present

As shown in FIG. 2, a cache management system of the present invention includes a CPU 21, a main memory 22, a cache controller 23, an instruction identifier 24, and a cache memory 25.

The CPU 21 executes program instructions. The main memory 22 stores all the instructions, including cache control instructions. The cache controller 23 receives an address signal of an executable instruction which is to be executed by the CPU 21 and fetches the executable instruction stored in the main memory 22. The instruction identifier 24 identifies whether or not the instruction stored in the main memory 22 is the cache control instruction and temporarily stores the instruction received from the main memory 22 The cache memory 25 stores the instruction including the instruction identifier 24 and provides the instruction to the CPU 21 under the control of the cache controller 23. Thus, some combinations of bits of an instruction that are not assigned as having any meaning to the CPU 21, have meaning only as cache control instructions. Accordingly, the width of the main memory 22 does not need to increase.

The cache controller 23, in advance of instruction execution by the CPU 21, determines a program to be executed by the CPU 21 to read the program information from the man memory 22 and reads the corresponding program information in advance if the cache control instruction is identified by the instruction identifier 24.

The cache control instruction identified by the instruction identifier 24 is input to the cache controller 23 to control the operation of the cache unit.

Figure 3:
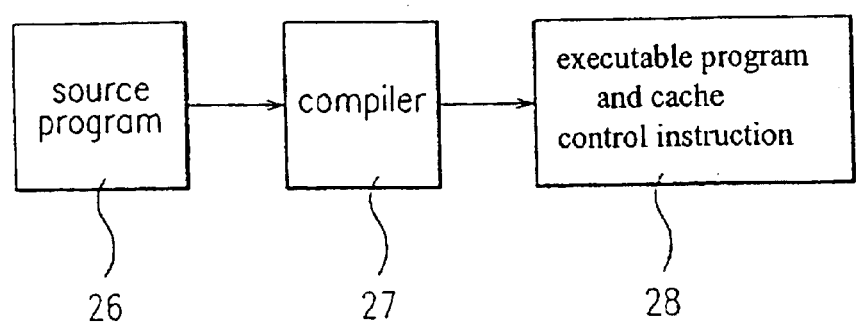
FIG. 3 is a block diagram illustrating a method of inputting a cache control instruction to a machine language executable program for controlling a cache unit according to the present invention.

As shown in FIG. 3, a method of converting program information to a machine language executable program for the CPU 21 using a cache unit according to the present invention includes the steps of compiling a source program 26 in a high level language, such as C, to a machine language executable program using a compiler 27, to be executed by the CPU 21 and inserting executable program and a cache control instruction 28 into the machine language executable program (i.e. program information to be stored in the main memory) so as to allow the cache unit to perform optimal operation.

The operation of the cache management system according to the present invention will be described below.

The cache controller 23 decodes and performs the control instruction. When the compiler 27 compiles the source program 26, the executable program and the cache control instruction 28 is inserted into die machine language executable program so as to allow the cache unit to perform optimal cache operation. For example, when the compiler 27 compiles the source program 26, the compiler 27 can identify the number of subroutines of the current program and their addresses.

If information such as the executable program and cache control command 28 is inserted into the machine language program the instruction identifier 24 fetches an instruction word (program information, including executable instruction and data) from the main memory 22 in the course of performing a program. If the instruction word is the cache control instruction, the instruction word is sent to the cache controller 23 without being stored in the cache memory 25.

In other words, after creating a program in a high-level language, such as C, the length of a subroutine which is called from a main routine is compiled to a cache control information and then inserted into the program in the main memory 22. Then, the cache controller 23 detects the compiled cache control information and fetches the instruction word (program information), which is to be requested by the CPU 21, to the cache memory 25 in advance from the main memory 22, so that cache operation can be performed rapidly. Thus, improving execution speed of the program is enhanced.

The instruction word input to the main memory 22 is in binary form. The cache control instruction is made with the remaining bits after the instruction word of the CPU 21 is expressed For example, if the instruction word where the 3 most significant bits are all "1" is used as the cache control instruction of the cache controller 23, rafter than an executable instruction of the CPU 21, the instruction identifier 24 decodes only the most significant 3 bits. As a result, it is possible to identify whether the ion word contains commands for the CPU 21 or for the cache controller 23.

In other words, the instruction identifier 24 identifies the input instruction using a decoder so as to fetch the executable instruction for the CPU 21 to the cache memory 25 and the cache control instruction to the cache controller 24.

Meanwhile, the cache controller 23 exactly predicts the position of the next instruction requested by the CPU 21 in response to the control instruction from the instruction identifier 24 and fetches the program information from the main memory 22 in order to store the program information in the cache memory 25. Then, the cache memory 25 provides the instruction stored therein to the CPU 21 upon request from the CPU 21.

If desired, the cache controller 23 of the cache unit according to the present invention can control the length of the current program of the routine such as a start address and an end address, the number of subroutines which the current program routine can access, addresses and lengths of the subroutines, and an address of an ended program routine. Unnecessary program information, such as the completed program routine may be overwritten in the cache memory 25 if the cache memory 25 is full.

The cache management system of the present invention has the following advantages.

Since the instruction identifier 24 identifies the cache control instruction in the executable program, which is programmed to identify the cache control instruction, the instruction requested by the CPU can be predicted exactly, so that it is possible to improve the cache hit ratio of the cache unit, thereby improving overall performance of the system.

It will be apparent to those skilled in the art that various modifications and variations can be made in the cache management system according to the present invention without departing from the spirit or scope of the invention. Thus, it is intended that the present invention covers the modifications and variations of the invention provided they come within the scope of the appended claims and their equivalents.

What is claimed is:

1. A cache management system comprising:
a main memory for storing executable instructions and information for identifying cache control instructions;
a central processing unit (CPU) for executing the executable instructions;
a cache unit including a cache memory and a cache controller; and
an instruction identifier for identifying that an instruction stored in the main memory is a cache control instruction or an executable instruction for the CPU such that the instruction identifier sends the cache control instruction to the cache controller and sends the executable instruction for the CPU directly to the cache memory; wherein
the cache controller predicts a next instruction to be executed by the CPU and executes the cache control instruction by reading program information corresponding to the cache control instruction in advance when the cache control instruction is identified by the instruction identifier; and
the cache memory stores the executable instruction for the CPU and data from the main memory and supplies the executable instruction for the CPU to the CPU under the control of the cache controller.

2. The cache management system as claimed in claim 1, wherein the cache controller controls a length of a current program routine, a number of subroutines, lengths of addresses of the subroutines, and an address of an ended program routine.

3. A computer system comprising:
a central processing unit;
a cache unit including a cache memory and a cache controller; and
a main memory for storing instructions and data, wherein the instructions include cache control instructions to be executed by the cache controller after identification by an instruction identifier, and executable instructions to be executed by the central processing unit;
wherein an instruction stored in the main memory includes information identifying whether the instruction is an executable instruction for the CPU or a cache control instruction for the cache controller; and
wherein the instruction identifier sends the cache control instructions to the cache controller and sends the executable instructions directly to the cache memory.

4. The computer system of claim 3, wherein the cache controller controls a length of a current program stored in the cache memory being executed by the central processing unit.

5. The computer system of claim 3, wherein the cache controller controls a number of subroutines stored in the cache memory which a current program can access.

6. The computer system of claim 3, wherein the cache controller controls an address of an ended program routine stored in the cache memory.

* * * * *